G. P. HERRICK.
ROTARY ENGINE.
APPLICATION FILED MAY 23, 1910.

1,014,150.

Patented Jan. 9, 1912.
6 SHEETS—SHEET 1.

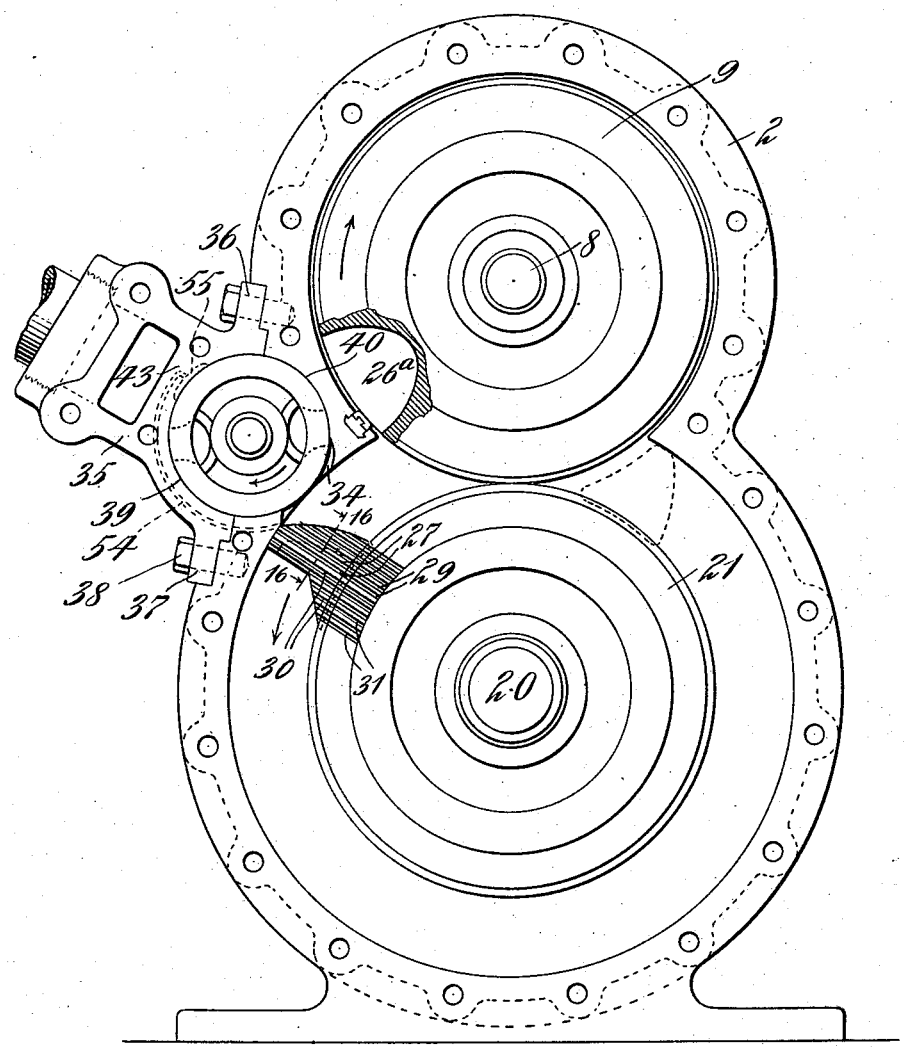

G. P. HERRICK.
ROTARY ENGINE.
APPLICATION FILED MAY 23, 1910.
1,014,150.
Patented Jan. 9, 1912.
6 SHEETS—SHEET 3.
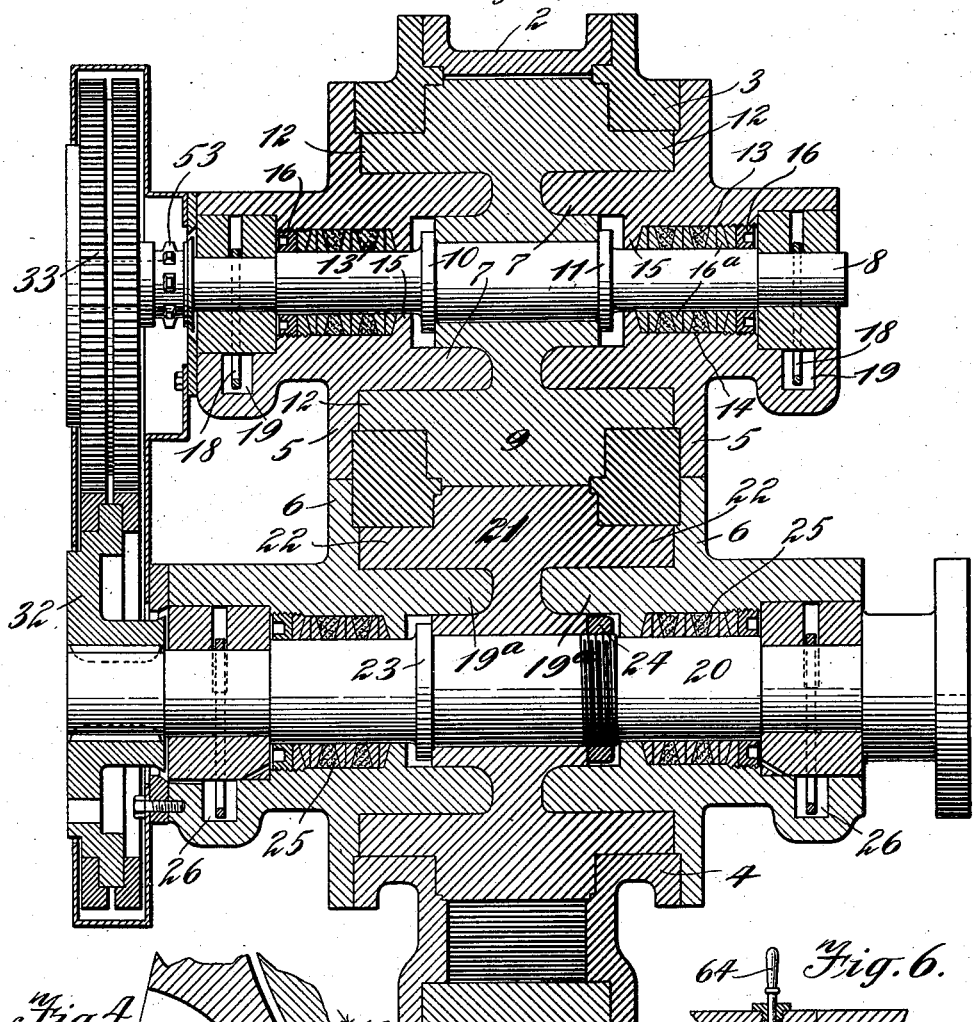

G. P. HERRICK.
ROTARY ENGINE.
APPLICATION FILED MAY 23, 1910.

1,014,150.

Patented Jan. 9, 1912.

6 SHEETS—SHEET 4.

Witnesses:

Gerardus Post Herrick, Inventor
By his Attorney

G. P. HERRICK.
ROTARY ENGINE.
APPLICATION FILED MAY 23, 1910.
1,014,150.
Patented Jan. 9, 1912.
6 SHEETS—SHEET 5.
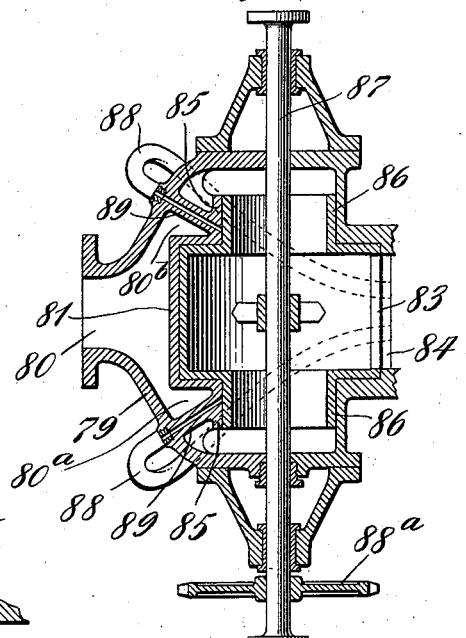
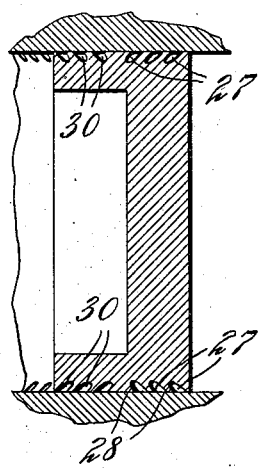
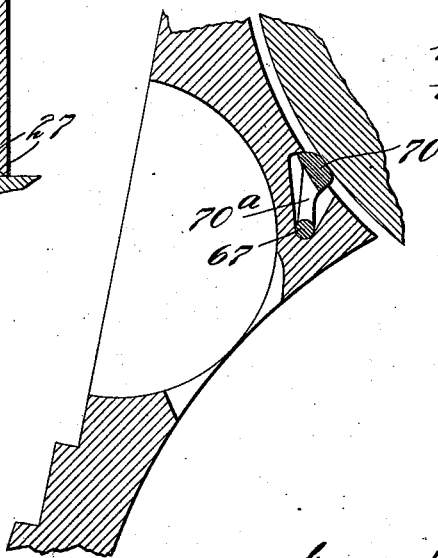
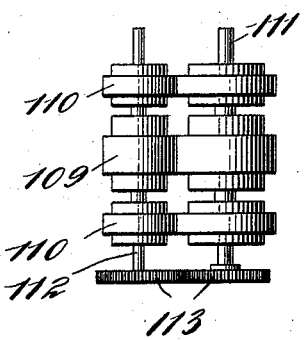

G. P. HERRICK.
ROTARY ENGINE.
APPLICATION FILED MAY 23, 1910.
1,014,150.
Patented Jan. 9, 1912.
6 SHEETS—SHEET 6.
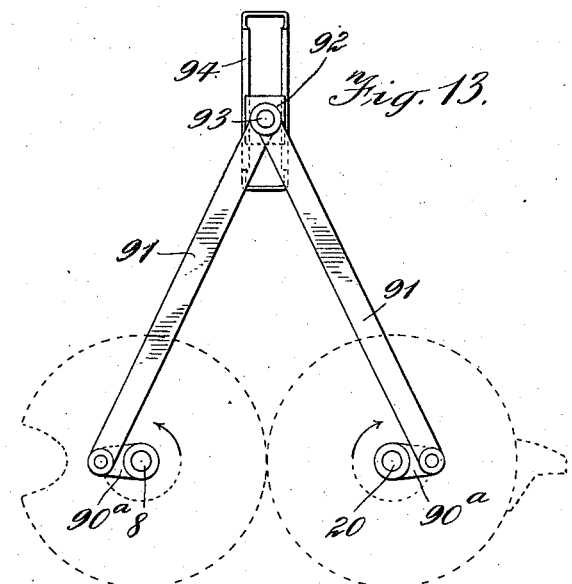
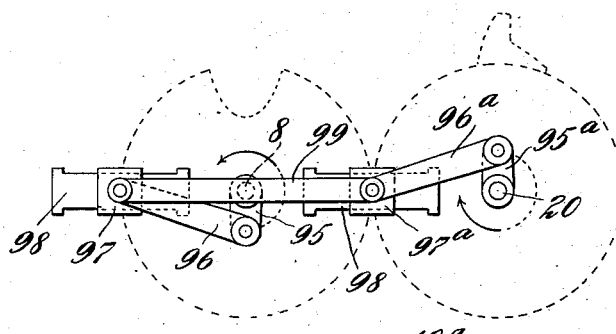
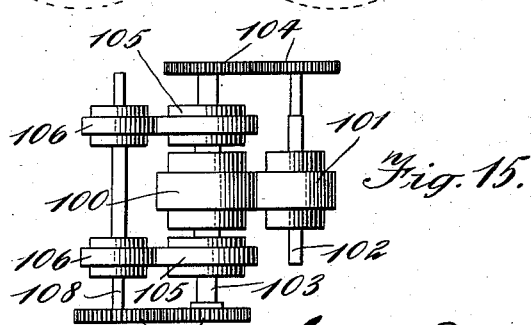
Witnesses:
Inventor
Gerardus Post Herrick
By his Attorneys
Gifford & Bull

UNITED STATES PATENT OFFICE.

GERARDUS POST HERRICK, OF NEW YORK, N. Y.

ROTARY ENGINE.

1,014,150.  Specification of Letters Patent.  Patented Jan. 9, 1912.

Application filed May 23, 1910. Serial No. 562,823.

*To all whom it may concern:*

Be it known that I, GERARDUS POST HERRICK, a citizen of the United States, and a resident of New York city, borough of Manhattan, in the county of New York and State of New York, have invented certain new and useful Improvements in Rotary Engines, of which the following is a specification.

My invention relates to new and useful improvements in rotary engines, and the same consists in the improvements to be fully described hereinafter and the novelty of which will be particularly pointed out and distinctly claimed.

I have fully and clearly illustrated my invention in the accompanying drawings to be taken as a part of this specification and wherein—

Figure 1:
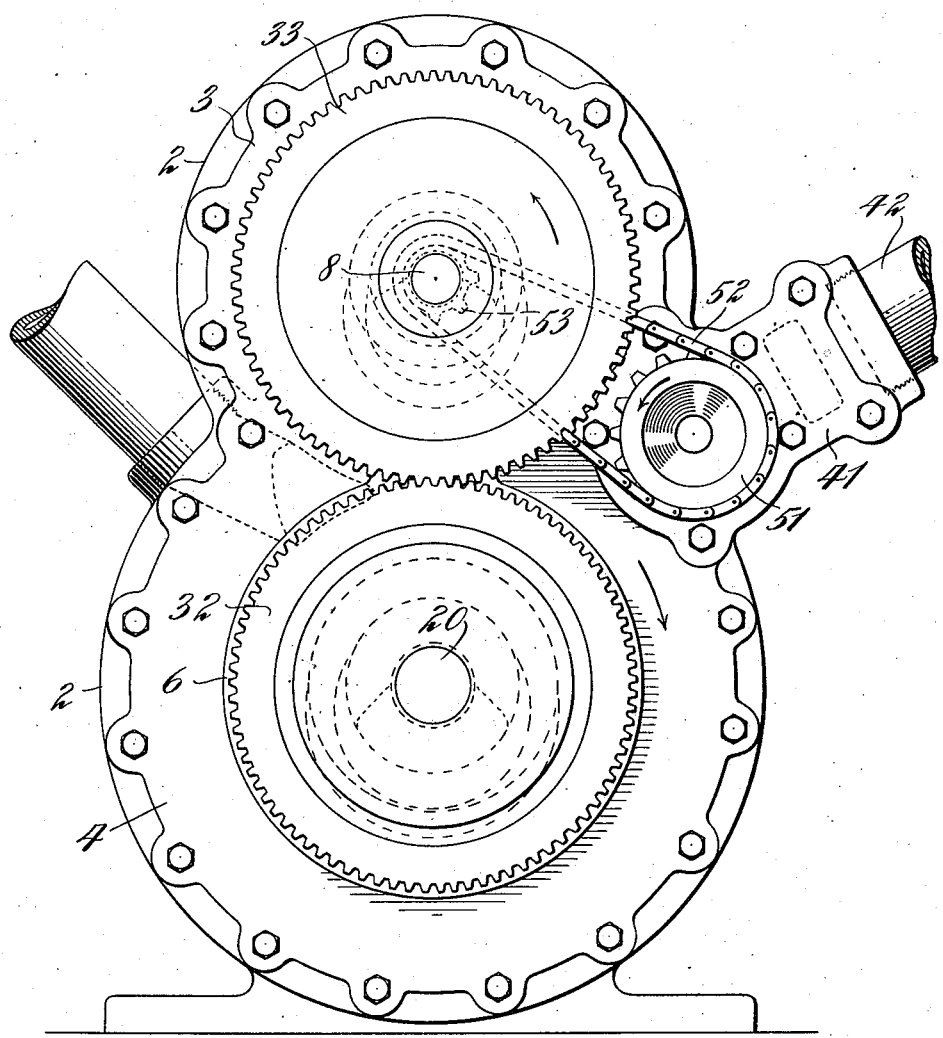
Figure 7:
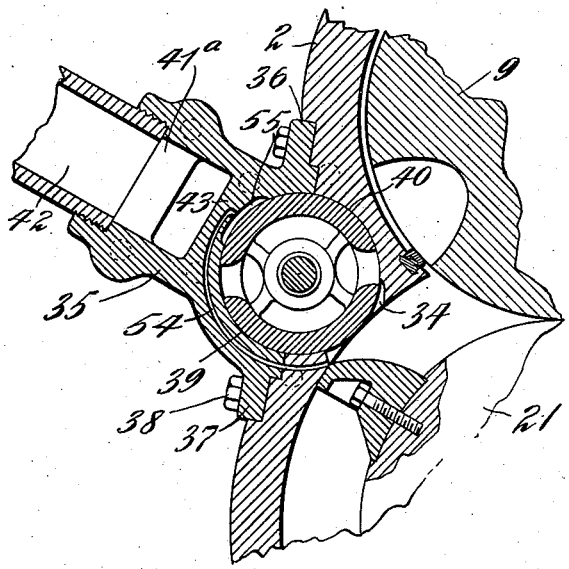
Figure 8:
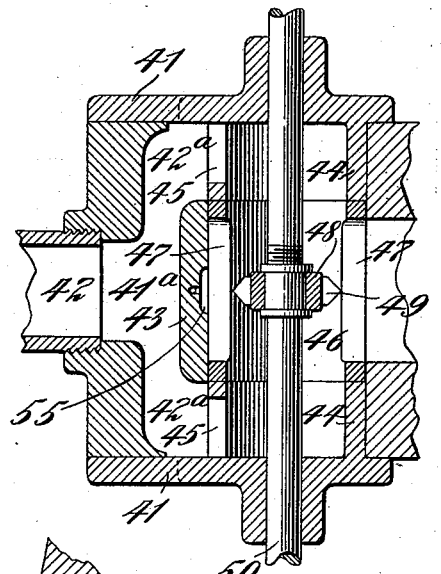
Figure 9:
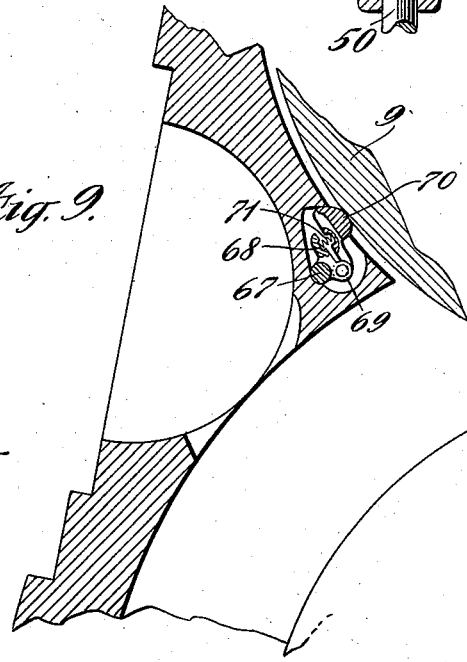
Figure 10:
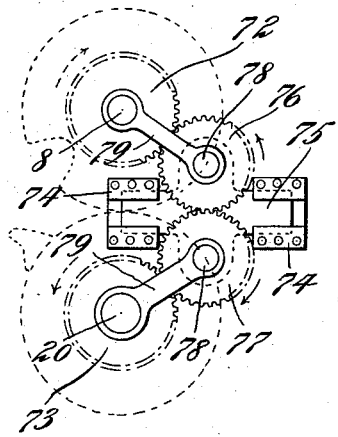

Figure 1 is a view in side elevation of a rotary engine embodying my invention; Fig. 2 is a view in side elevation taken from the side opposite to that shown in Fig. 1, the side plates of the casing being removed to disclose the interior of the engine; Fig. 3 is a vertical central transverse section through the engine; Fig. 4 is a detail sectional view of a steam check for coöperation with one of the rotatable parts of the invention; Fig. 5 is a detail sectional view of a modified form of the check shown in Fig. 4; Fig. 6 is a detail section showing a means for adjusting the checks shown in Figs. 4 and 5; Fig. 7 is a transverse section through the admission valve; Fig. 8 is a longitudinal section through the admission valve; Fig. 9 is a detail section of another form of steam check; Fig. 10 is a view in side elevation of means for transmitting rotary movement from the rotor to the abutment; and for Fig. 11 is a longitudinal section through another form of admission valve; Fig. 12 is a detail section of another form of check; Figs. 13 and 14 are views in elevation of other means for transmitting rotary motion from the rotor to the abutment; Fig. 15 is a plan view of an arrangement of rotary engines whereby the balancing of the radial load on the rotors of the engines is provided; Fig. 16 is a section on the line 16—16 of Fig. 2; Fig. 17 is a plan view of another form of balancing arrangement; Figs. 18 and 19 are views in side elevation and plan, respectively, of the form of packing used in connection with the rotor and abutment shafts.

Referring to the drawings by characters of reference, 1 designates generally the casing of the rotary engine embodying my invention, said casing including a center body 2, having upper and lower substantially cylindrical lobes 3, 4 arranged with their transverse axes on the same vertical line, said lobes opening into each other at their point of union. The opposite open ends of the center body lobes are closed by face plates securely bolted to the center body, said plates being divided into upper and lower sections 5, 6, respectively, which are independently applicable to and removable from the center body. The upper sections of the end plates, which sections close the upper lobe 3, are provided with inwardly directed cylindrical extensions 7, preferably in the form of annular flanges, said extensions being directed inward toward each other and being arranged with their central axes coincident. Extending through the face plates and the extensions 7 is a horizontally disposed shaft 8, upon which is mounted to turn therewith a cylindrical abutment 9, the same being keyed to the shaft and held against movement lengthwise thereof by a fixed collar 10, and an adjustable collar 11, the latter being threaded on the shaft, the abutment being clamped between said collars. The abutment turns between the adjacent inner ends of the extensions 7 and is formed with lateral annular extensions 12 which project and turn between the said extensions 7 and the parts of the center body which surround said extensions, the latter being of less diameter than the openings through which they extend.

The shaft 8 as above stated, projects through the face plates 5 and the extensions 7 thereof, and in order to prevent steam leakage between the parts, I provide suitable packing consisting of annular elements 13 having adjacent inclined faces, said elements surrounding the shaft and being located within recesses 14 in the said face plates, and being clamped between shoulders 15 in the face plates and adjustable collars 16 threaded into said recesses. The annular elements are arranged with their inclined faces oppositely directed so that movement of the elements toward each other will serve to move one set of elements outward and the other set inward. I prefer that this packing be of alternated fibrous and metal elements, the metal elements being in the form of split rings 16 having overlapping ends, the space between the meeting ends of which are bridged by a plate 17, which prevents the fibrous packing from getting between the ends of the said rings. I prefer that the metallic elements be formed with straight faces which abut each other and with outwardly inclined faces, the inclined face of one metallic element converging outwardly toward the corresponding face of the adjoining metallic element. The intervening fibrous elements have their inclined faces formed to converge toward the shaft.

The ends of the shafts may be lubricated in any desired manner, but I prefer to employ ring oilers, the rings 18 turning in oil pockets 19 in the said face plates 5. Similar to the face plates 5 of the abutment casing, the face plates 6 of the lower cylinder are formed with inwardly projected extensions 19 consisting of annular flanges arranged on the same axis, and extending through these face plates 5 within the said flanges is a rotor shaft 20 carrying a rotor 21, the latter projecting and turning between the ends of the extensions 19, and having lateral extensions 22, arranged between the outer cylindrical faces of said extensions 19 and the adjacent wall of the casing. The rotor is keyed to the shaft, and is held between a fixed collar 23, and an adjustable clamping collar 24 threaded on the shaft, said collars holding the rotor against movement longitudinally of the shaft. The shaft may be suitably packed as at 25, and provided with lubricating means as shown at 26. As these means are the same as those employed for performing the same functions regarding the abutment shaft, I do not deem it necessary to repeat a detailed description of them at this point.

The rotor is of less diameter than the chamber in which it turns to provide an annular steam space, and projecting radially from the rotor and rigidly connected thereto is a piston blade adapted to receive expansive force of steam to cause it to rotate the rotor, the steam being admitted to the rotor cylinder between the abutment and said blade, the inlet being controlled by a valve to be presently described. The rotor and the abutment above described are arranged to rotate in rolling contact with each other, and the abutment is provided with a recess 26, which receives the piston blade and permits the latter to pass the abutment. This piston blade at its end and side faces passes in close proximity to the casing wall, but out of contact therewith. In order to reduce leakage past the piston, I form the side faces of the said blade with grooves or channels 27 arranged parallel to each other and extending across the line of rotation. These grooves are so formed that their line of depth is inclined forwardly relative to the line of movement of the blade, the forward side of the groove, in section, curving to meet the rear side as at 28. By this arrangement steam tending to leak by the piston passes into these grooves and is thrown back by the curved face 28 and out against the adjacent face of the casing, thus forming a counter current tending to oppose the flow of steam past the blade and reducing the leakage at this point. I may also similarly groove the side faces of the rotor at a point below the blade, as shown at 29, to further reduce the leakage. I also provide the side faces of the blade with a second set of grooves 30 similar to those just described but disposed with their lines of depth inclined backwardly, relative to the direction of movement of the rotor, the purpose of these grooves being to catch up and carry with the blade the lubricant within the casing so as to effectively lubricate the sides of the blade. The side faces of the rotor adjacent the blade may also be provided with a similar set of grooves, as shown at 31, both sets of lubricant-catching grooves being preferably arranged in advance of the leakage-reducing grooves. The rotor and abutment shafts each carry a spur gear 32, 33 respectively, arranged in mesh with each other, whereby the abutment shaft is rotated by the rotor shaft, the gears being proportioned so that the abutment makes a single revolution for every revolution of the rotor shaft.

Located in the lower casing wall is a steam inlet 34 through which steam is admitted between the abutment and the rotor blade to exert its force expansively on the latter, and this inlet is controlled by a cut-off valve which will now be described: Bolted to the engine casing is a valve casing consisting of a center body 35 having wings 36, 37 to receive fastening bolts 38 by means of which said center is secured in place, the center of the valve and the adjacent part of the engine casing being each formed with a semi-cylindrical recess 39, 40 respectively, which unite to form a cylindrical bearing extending transversely of the engine casing, as shown in Figs. 2 and 7. The ends of the center body are closed and said cylindrical bearing also, by side plates 41 which cover the sides of the center body and overlap the bearing and the engine casing, said plates being bolted to the center body and the engine casing, and completing the valve casing. The valve casing is formed with an inlet 41 through the center body to which is connected a supply pipe 42, and within the center body is a web 43 forming the semi-cylindrical bearing surface heretofore described, said web being of less width than the center body and dividing the inlet into branches 42$^a$, 42$^a$.

The end plates 41, 41 are each provided with an annular flange 44 which flanges project into the valve casing between the engine casing and the valve casing and each is formed with a port 45, which communicates with the inlet branches 42ª, 42ª. Rotatably arranged within the cylindrical space bounded by the recess in the casing the web 43, and the inner ends of said flanges 44, 44, is a rotary valve consisting of a hollow open ended cylindrical member 46, the open ends of which communicate respectively with said ports 45, and having diametrically located openings 47, which, when the valve is rotated, are successively brought into register with the inlet 34 to permit steam to flow into the rotor casing. The valve is formed with a hub 48 connected to the barrel by spokes 49, said hub being mounted upon a valve shaft 50, having bearings in the end plates 41, the shaft being provided with a sprocket gear 51 which is driven by a sprocket chain 52 driven by a sprocket 53 on the abutment shaft. The sprocket gears are so proportioned that the valve shaft is turned one-half a revolution for every complete revolution of the abutment and the rotor.

It will be seen upon reference to Figs. 2 and 7, that during its rotation a part of the valve is subjected to pressure of the steam within the rotor casing, and I balance the load thus caused by providing a duct 54 leading from the steam space of the rotor casing, through the valve casing and into a pocket 55 in the diaphragm or web 43, and opening against the rotary valve at a point opposite the area subjected to the steam pressure in the rotor casing.

I provide simple and effective means for reducing leakage of steam from the rotor casing at the inlet point into the space between the abutment and its casing, said means consisting of a check or clearance strip which is arranged within the abutment casing transversely of the inner curved surface thereof, said strip being provided with adjusting means whereby it may be adjusted to regulate the clearance between the abutment and the casing. The strip is shown at 56 in Figs. 4, 5 and 6, being located within a transverse pocket in the casing and held against endwise movement by the ends of the pocket but free to be adjusted toward and away from the abutment. The strip is formed with an inclined rear face as at 58 and a longitudinal dovetail groove 59 in said face, which groove receives a dovetail tongue 60 on a wedge 61, the latter having a straight face 62 sliding on the bottom of said pocket and an inclined face 63 coöperating with the inclined face on the said strip. Connected to the wedge is an operating member 64 projecting through the casing wall and adapted to be operated manually to slide the said wedge to either move the check strip toward or away from the abutment.

In the form of check shown in Fig. 4, the strip 56 is rigidly connected to the operating wedge, but in Fig. 5 a spring 66 is placed between the wedge and the strip and enough play is provided between the parts to permit the spring to cushion the strip so that the said strip is yieldingly engaged by the abutment.

In Figs. 9 and 12 of the drawings I show another form of packing carried by the casing for producing the clearance between the abutment and the casing. In Fig. 9 this construction includes a transversely arranged rotatable rod 67 carrying an arm 68 and an arm 69, to the latter of which is pivoted a check strip 70 which is normally thrust outward into engagement with the cylindrical surface of the abutment by an expansive spring 71 located between the rear face of the check strip and the arm 68. The rod 67 extends to a point exterior of the casing where it can be conveniently operated manually. It will be seen that by rotating the rod to the right, as shown in Fig. 9, the check strip will be moved to more closely approach the surface of the abutment, while a reverse movement of the rod serves to move the check strip away from the abutment. In Fig. 12 this pivoted check strip is shown rigidly mounted on the rod 67, the same being connected thereto by an arm 70ª.

In Fig. 10 I have shown means to insure proper engagement between the grooves on the abutment and the rotor irrespective of changes in the positions of said grooves due to expansion or contraction of the rotors or of the casing. In this form of the invention the abutment shaft is provided with a gear 72 and the rotor shaft with a gear 73, and at a point intermediate the shafts I provide a rectilinear guide frame 74 in which slides a cross head 75 upon which are mounted upper and lower gears 76, 77 respectively, said gears being arranged in mesh with each other and the upper gear in mesh with the gear 72 on the abutment shaft, the lower gear being in mesh with the gear 73 on the rotor shaft. The shafts or gudgeons 78 of the gears 76, 77 are connected to the abutment and rotor shafts 8 and 20 by rigid distance links 79, whereby the gears 76, 77 are maintained in fixed relation to the gears 72 and 73. By this arrangement it will be seen that should the rotor shafts be moved away from each other, due to expansion of the parts, the distance rods or links will serve to drive the gears 76 and 77 inward into the space between the gears 72, 73, the sliding support provided by the slide 75 and the guide 74 permitting this movement. Should there be any contraction of the casing or other parts, the movement of the shafts 8 and 20 toward each other merely serves to move the gears 76, 88 outward from between said rotor shafts. By this arrangement it will be apparent that the gears are always maintained in proper mesh irrespective of the expansion or contraction of the casing due to temperature changes.

In Fig. 11 I have shown a modified form of the rotatable inlet valve for the rotor cylinder. In this form the casing of the valve is shown at 79, the same being provided with an inlet 80 which is divided into two branches 80$^a$, 80$^b$ by a diaphragm 81, said diaphragm and the casing being formed to provide a cylindrical valve seat in which turns a rotatable hollow valve 82 having an opening 83 adapted to be brought into register with an outlet 84 of the casing. The diaphragm is formed with reduced cylindrical end portions 85, in which turn extensions 86 on the ends of the hollow valve, the extensions on the diaphragm being separated from the end portions of the casing, so that steam from the inlet will pass through the branches thereof around the ends of the diaphragm into the hollow valve through the extensions 86 thereof, and from the hollow valve out through the outlet 84. The valve is mounted upon a suitable shaft 87 carrying one end of the sprocket 88, driven by a chain passing over the sprocket on the abutment shaft in substantially the same manner as for the form of valve previously described. As shown in the drawings, this valve is provided with but a single opening and means is provided for balancing the load exerted on the closed portion of the valve when the same closes the outlet 84, this means consisting of pipes 88 by means of which steam is admitted from the engine cylinder to ducts 89 in the valve casing which open upon the exterior surfaces of the extensions 86 at a point opposite to the valve outlet. By this arrangement it will be apparent that any load on the valve will be balanced by a corresponding pressure exerted upon said extension.

In Fig. 13 I have shown another means for connecting the rotor and abutment shafts to cause the same to revolve in opposite directions. In this embodiment the rotor and abutment shafts are each provided with a crank 90$^a$, one crank being arranged to project in a direction opposite to the other, and being each connected by a connecting rod 91 to a rectilinear slide 92, one end of each of said rods being pivotally connected to the outer end of one of the cranks and the opposite ends of said rods being pivotally connected to the rectilinear slide on the same, both as shown at 93. This slide is adapted to move back and forth within a suitable rectilinear guide 94 mounted upon the casing, or other support. By this arrangement the rotation of the rotor and its crank will serve to reciprocate the slide 92 by means of the connecting rod 91 connecting said crank and slide, and this reciprocating movement, by means of the opposite connecting rod 91, will impart a rotary movement to the abutment shaft, said rotary movement being in a direction opposite to that in which the rotor shaft moves.

Another embodiment of substantially the same principle shown in Fig. 13 is shown in Fig. 14, in which the abutment shafts are each provided with a crank shown respectively at 95, 95$^a$, said cranks being each connected by links 96, 96$^a$ to rectilinear slides 97, 97$^a$ respectively, arranged upon guides 98, said guides being connected by a rigid distance bar 99. In this form of driving means, when the rotor is turned in the direction of the arrow, the movement of the crank 95$^a$ serves to impart a reciprocating movement to the slides 97, 97$^a$ and by means of the connecting rod 96 this reciprocating movement is converted into a rotary movement of the abutment shaft, the rotation of the abutment shaft being in a direction opposite to that of the rotor shaft.

In Fig. 15 I have shown an arrangement of a plurality of engines of the general type heretofore described by means of which the load on the rotor shafts is balanced. In this arrangement 100 is the casing of the rotor and 101 the casing of the abutment for one engine, the abutment shaft being shown at 102 and the rotor shaft at 103, the abutment shaft being driven by intermeshing gears 104 carried on said shafts. Arranged on opposite sides of the cylinder 100 or rotor cylinders 105 and abutment cylinders 106 of separate engines, the rotors of which are cylinders 106 of separate engines, the rotors of which are arranged on lateral extensions of the shaft 103 for the rotor 100, and this shaft at the end opposite to the gears 104 is connected by gearing 107 to an abutment shaft 108 upon which the abutment of both of the outer engines are secured. The surfaces of the rotors of the laterally disposed engines are so proportioned that their combined area is equal to the area of the rotor surface of the intermediate engine, and the piston blades on these rotors are so arranged that when steam is simultaneously admitted to all three of the engines, the area of the rotor surfaces and the lateral engine, which is subjected to load, will equal the area of the rotor surface of the intermediate engine which is subjected to load, the result being that the combined loads on the lateral engines serves to counterbalance the radial load on the rotor of the intermediate engine. It will be understood that the inlet to all three of the rotor cylinders takes place at the same time.

In Fig. 17 I have shown a balancing arrangement in which a central engine is provided as shown at 109 and lateral engines 110, the rotors of all of said engines being arranged on the same shaft 111 and the abutments of said engines being all arranged on the same shaft 112, said shafts being geared together by gearing 113. In this embodiment the area of the rotors of the engines 110 combine to equal the area of the surface of the rotor 109 and the steam is so introduced into all of said engines that the area of the rotors of the engines 110 subjected to radial load will equal in total the area of the rotor in the engine 109, which is subjected to radial load. I accomplish this by arranging the blades on the rotors of the engines 110 at an angle of 120°.

Having thus described my invention, what I claim as new and desire to secure by Letters Patent is:—

1. In a rotary engine, a casing having an inlet and an exhaust, a rotor, a rotary abutment in rolling contact with the rotor, a clearance strip in the casing, and manually operable means engaging said strip and extending exterior of the casing for positively moving said strip toward and away from the abutment.

2. In a rotary engine, a casing having an inlet and an exhaust, a rotor, a rotary abutment in rolling contact with the rotor, a manually operable member projecting into the casing, a clearance strip movably connected to the operating member, and means whereby movement of the operating member relative to the clearance strip positively moves the latter toward or away from the casing.

3. In a rotary engine, a casing having an inlet and an exhaust, a rotor, a rotary abutment in rolling contact with the roller, a manually operable member projecting into the casing, a clearance strip movably connected to the operating member, and a spring for cushioning the clearance strip.

4. In a rotary engine, a casing having an inlet and an exhaust, a rotor, a rotary abutment in rolling contact with the rotor, a manually operable member projecting into the casing, a clearance strip movably connected to the operating member, and a spring for cushioning the clearance strip, said spring being located between said member and the strip.

5. In a rotary engine, a casing having an inlet and an exhaust, a rotor, a rotary abutment coöperating with the rotor, a rotatable member projecting into the casing, a clearance strip, and means whereby said strip is positively moved toward and away from said abutment by the rotation of said rotatable member.

6. In a rotary engine, a casing having an inlet and an exhaust, a rotor, a rotary abutment coöperating with the rotor, a rotatable member projecting into the casing, a clearance strip hinged to said rotatable member, and adapted to be positively moved toward and away from the abutment by the rotation of said member.

7. In a rotary engine, a casing having an inlet and an exhaust, a rotor, a rotary abutment coöperating with the rotor, a rotatable member projecting into the casing, a clearance strip hinged to said rotatable member, and adapted to be positively moved toward and away from the abutment by the rotation of said member, and means for cushioning said strip.

8. In a rotary engine, a casing having an inlet and an exhaust, a rotor, a rotary abutment coöperating with the rotor, a rotatable member projecting into the casing, a clearance strip hinged to said rotatable member, and adapted to be positively moved toward and away from the abutment by the rotation of said member, and a cushioning spring abutting said rotatable member and strip to cushion the latter.

9. In a rotary engine, a casing having an inlet and outlet, a rotor, a rotary abutment in rolling contact with the rotor, a rod rotatably mounted in the casing and a clearance strip connected to the rod and coöperating with the abutment, and adapted to be moved toward and away from the abutment by rotation of said rod.

10. In a rotary engine, a casing having an inlet and outlet, a rotor, a rotary abutment in rolling contact with the rotor, a rod rotatably mounted in the casing and a clearance strip hingedly connected to the rod and coöperating with the abutment, and adapted to be moved toward and away from the abutment by rotation of said rod.

11. In a rotary engine, a casing having an inlet and outlet, a rotor, a rotary abutment in rolling contact with the rotor, a rod rotatably mounted in the casing and a clearance strip yieldingly connected to the rod and coöperating with the abutment, and adapted to be moved toward and away from the abutment by rotation of said rod.

12. In a rotary engine, a casing having an inlet and outlet, a rotor, a rotary abutment in rolling contact with the rotor, a rod rotatably mounted in the casing and a clearance strip hingedly connected to the rod and coöperating with the abutment, and adapted to be moved toward and away from the abutment by rotation of said rod, and a cushion between the strip and the rod.

13. A balancing arrangement for rotary engines, comprising an engine having a rotor mounted on a shaft and provided with a blade and an abutment coöperating with the rotor, and having a variable area subjected to a radial load, and a plurality of engines having rotors on said shaft, each of said rotors being provided with a blade and having a variable area subjected to load, and each of said plurality of engines having an abutment coöperating with its rotor, the sum of said areas being equal to the load area of the first mentioned rotor, the blades on said plurality of rotors being set at an angle of 120° to the blade of the first mentioned rotor.

14. A rotary engine, comprising a casing, a piston, the latter having a groove in its face adjacent to the casing, said groove extending in a direction across the line of rotation and in line of its depth directed forwardly to the line of rotation of the piston.

15. A rotary engine, comprising a casing, a piston, the latter having a groove in its face adjacent to the casing, said groove extending in a substantially radial direction across the line of rotation and in line of its depth directed forwardly to the line of rotation.

16. A rotary engine, comprising a casing, a piston, the latter having a groove in its face adjacent to the casing, said groove extending in a direction across the line of rotation, said groove, in the line of its depth, being inclined backwardly relative to the line of movement.

17. A rotary engine, comprising a casing, a piston, the latter having a groove in its face adjacent to the casing, said groove extending in a direction across the line of rotation, said groove, in the line of its depth, being inclined forwardly relative to the line of movement.

18. A rotary engine, comprising a casing, a piston, the latter having a groove in its face adjacent to the casing, said groove extending in a direction across the line of rotation, said groove in the line of its depth being inclined forwardly relative to the line of movement, in section one side of said groove curving until it meets the other side.

In testimony whereof I have signed my name to this specification in the presence of two subscribing witnesses.

GERARDUS POST HERRICK.

Witnesses:
 GEO. C. CHENY,
 C. G. HEYLMUN.

---

Copies of this patent may be obtained for five cents each, by addressing the "Commissioner of Patents, Washington, D. C."